(12) United States Patent
Oakes et al.

(10) Patent No.: US 6,948,486 B2
(45) Date of Patent: Sep. 27, 2005

(54) SYSTEM AND METHOD FOR DERATING AN ENGINE TO ENCOURAGE SERVICING OF A VEHICLE

(75) Inventors: Jeffrey L. Oakes, Columbus, IN (US); Martin Chiaramonte, Nashville, TN (US); Michael Prostakov, Columbus, IN (US)

(73) Assignee: Fleetguard, Inc., Nashville, TN (US)

( * ) Notice: Subject to any disclaimer, the term of this patent is extended or adjusted under 35 U.S.C. 154(b) by 0 days.

(21) Appl. No.: 10/637,358

(22) Filed: Aug. 8, 2003

(65) Prior Publication Data

US 2004/0093854 A1 May 20, 2004

Related U.S. Application Data

(63) Continuation-in-part of application No. 10/185,517, filed on Jun. 28, 2002, now Pat. No. 6,651,638.
(60) Provisional application No. 60/430,851, filed on Dec. 4, 2002.

(51) Int. Cl.$^7$ .......................... F02D 41/22; F01N 3/021
(52) U.S. Cl. .......................... 123/676; 123/396; 60/277; 60/285
(58) Field of Search ................... 123/396, 676; 60/277, 285, 311

(56) References Cited

U.S. PATENT DOCUMENTS

| | | | |
|---|---|---|---|
| 4,319,896 A | 3/1982 | Sweeney | |
| 4,538,411 A | 9/1985 | Wade et al. | |
| 4,604,868 A | 8/1986 | Nomoto et al. | |
| 4,934,142 A | 6/1990 | Hayashi et al. | |
| 4,986,069 A | 1/1991 | Barris et al. | |
| 5,060,474 A | 10/1991 | Aramaki | |
| 5,067,320 A | 11/1991 | Kanesaki | |
| 5,211,009 A | 5/1993 | Houben et al. | |
| 5,319,930 A | 6/1994 | Shinzawa et al. | |
| 5,331,808 A | 7/1994 | Koike | |
| 5,373,733 A | 12/1994 | Fuchs et al. | |
| 5,511,413 A | 4/1996 | Pfister et al. | |
| 5,519,992 A | 5/1996 | Hosoya et al. | |
| 5,524,433 A | 6/1996 | Adamczyk et al. | |
| 5,544,482 A | 8/1996 | Matsumoto et al. | |
| 5,595,580 A | 1/1997 | Kawamura | |
| 6,010,547 A | 1/2000 | Jeong et al. | |
| 6,076,504 A | * 6/2000 | Stavnheim et al. | ..... 123/198 D |
| 6,245,306 B1 | 6/2001 | Miyazaki et al. | |
| 6,397,587 B1 | 6/2002 | van Nieuwstadt et al. | |
| 6,467,472 B1 | 10/2002 | Strauss | |
| 6,505,466 B1 | * 1/2003 | Nagafusa et al. | ............. 60/298 |
| 6,578,555 B2 | * 6/2003 | Sykes | ..................... 123/198 D |
| 6,651,638 B1 | * 11/2003 | Oakes | ........................ 123/676 |

* cited by examiner

Primary Examiner—Erick Solis
(74) Attorney, Agent, or Firm—Woodard, Emhardt, Moriarty, McNett & Henry LLP

(57) ABSTRACT

In one embodiment of the present invention, a system is disclosed for monitoring the backpressure produced by a particulate filter of an internal combustion engine. When the backpressure of the engine exceeds a predetermined threshold, indicating that the particulate filter should be serviced soon, an input to the electronic control module (ECM) indicating the intake manifold boost pressure is shunted to ground, thereby giving the ECM a false indication that no boost is being applied to the intake manifold. This will cause the ECM, according to its normal engine management software, to derate the engine performance to a "no air torque setting", thereby limiting the amount of torque that the vehicle operator can extract from the engine. This decreased performance of the engine provides a very high incentive to the vehicle operator to bring the vehicle in for servicing, at which point the particulate filter can be serviced. Upon servicing of the particulate filter, the backpressure threshold condition is no longer met, the input line to the ECM from the boost pressure sensor is no longer shunted to ground, and engine operation is returned to normal. Other embodiments of the present invention contemplate the use of engine performance derating in order to provide the vehicle operator with an incentive to have any sensed engine or vehicle condition serviced.

13 Claims, 7 Drawing Sheets

SYSTEM AND METHOD FOR DERATING AN ENGINE TO ENCOURAGE SERVICING OF A VEHICLE

CROSS REFERENCE TO RELATED APPLICATIONS

The present application is a continuation-in-Part application of United States Utility Application Ser. No. 10/185,517, filed Jun. 28, 2002 now U.S. Pat. No. 6,451,638 and entitled System and Method for Derating an Engine to Encourage Servicing of a Vehicle, and this application also claims priority from United States Provisional Patent Application Ser. No. 60/430,851, filed Dec. 4, 2002 and entitled System and Method for Derating an Engine to Encourage Servicing of a Vehicle. The text and drawings of both of these applications are hereby incorporated by reference in their entireties.

TECHNICAL FIELD OF THE INVENTION

The present invention generally relates to internal combustion engines and, more particularly, to a system and method for derating an engine to encourage servicing of a vehicle.

BACKGROUND OF THE INVENTION

It is well established that vehicles having internal combustion engines require both periodic routine maintenance and non-routine maintenance, particularly with respect to the internal combustion engine. Many elements of an internal combustion engine are designed to receive preventative maintenance at preestablished times or to require servicing as the performance of various components is compromised through use. For example, and not by way of limitation, many vehicles include internal combustion engines which have a particulate filter disposed in-line with the exhaust system. One such prior art internal combustion engine is illustrated schematically in FIG. 1.

As is known in the art, an internal combustion engine 10 includes an intake manifold 12 for the induction of air to be mixed with the fuel supply (not shown). The engine 10 also includes an exhaust manifold 14 for carrying away exhaust gases produced by the combustion process. Some engines, such as the one illustrated in FIG. 1, include a turbocharger 16, which utilizes a finned wheel 18 driven by exhaust gases to rotate a coupled compressor wheel 20 that is operative to compress fresh intake air at the inlet 22 in order to provide a denser air supply to the intake manifold 12. The incorporation of a turbocharger 16 is not necessary for practice of the present invention.

The engine 10 may have a particulate filter 24 positioned in-line with the exhaust system, particularly if the engine 10 is a diesel engine. The function of the particulate filter is to trap the majority of solid particulate matter produced by the combustion process within the engine 10 before the exhaust gases reach other sensitive exhaust aftertreatment components (such as a catalytic converter) downstream 26 from the particulate filter 24 or before the exhaust gases are simply exhausted to the environment.

It is well known in the art that a particulate filter 24 will eventually become partially clogged by the particulate matter that it is extracting from the exhaust gas. Such partial clogging creates a restriction to the flow of exhaust gases through the particulate filter 24, thereby increasing the pressure of the exhaust gases upstream from the particulate filter 24. This increase in exhaust gas pressure is known as backpressure. Increases in backpressure actually produce work in opposition to the productive work being performed by the engine 10, thereby lowering its performance. Because of this, it is desirable to clean or replace the particulate filter 24 after it has achieved some level of particulate blockage. In the prior art system shown in FIG. 1, the backpressure is measured by a pressure sensor 28 and the signal is applied as an input to an electronic control module (ECM) 30, which functions as a control system managing performance of the engine 10. The software within ECM 30 is designed to evaluate the backpressure sensed by pressure sensor 28 in comparison to two thresholds. When the backpressure exceeds a first threshold, the ECM 30 activates a first output in order to illuminate a yellow warning light 32 that is visible to the driver. When the backpressure sensed by sensor 28 exceeds a second, higher level, ECM 30 activates a second output in order to illuminate a red warning light 34, also visible to the driver. It will be understood that sensor 28 can be a transducer or simply a threshold switch.

Ideally, upon observation of the yellow warning light 32, the driver of the vehicle will arrange for service of the particulate filter 24 at the next available opportunity. Certainly by the time the red warning light 34 is illuminated, service of the particulate filter 24 should be a high priority for the driver of the vehicle. Unfortunately, many engines 10, particularly heavy duty diesel engines, are installed in vehicles which are being driven by persons other than those who own the vehicles. Such persons often do not have maintenance of the vehicle as their highest priority, particularly when the operator of the vehicle receives compensation in proportion to the amount of time that the vehicle is being operated.

The above-illustrated problem in inducing a vehicle operator to perform service of the particulate filter 24 is merely illustrative of a more widespread problem in encouraging vehicle operators to perform any necessary service that is not severely impacting the operability of the vehicle. In many cases, delaying such service can cause further damage to the vehicle, greatly increasing the cost of service. There is therefore a need in the prior art for a system which will provide an increased incentive to the operator of the vehicle to perform necessary service to the vehicle. The present invention is directed toward meeting this need.

SUMMARY OF THE INVENTION

Figure 1:
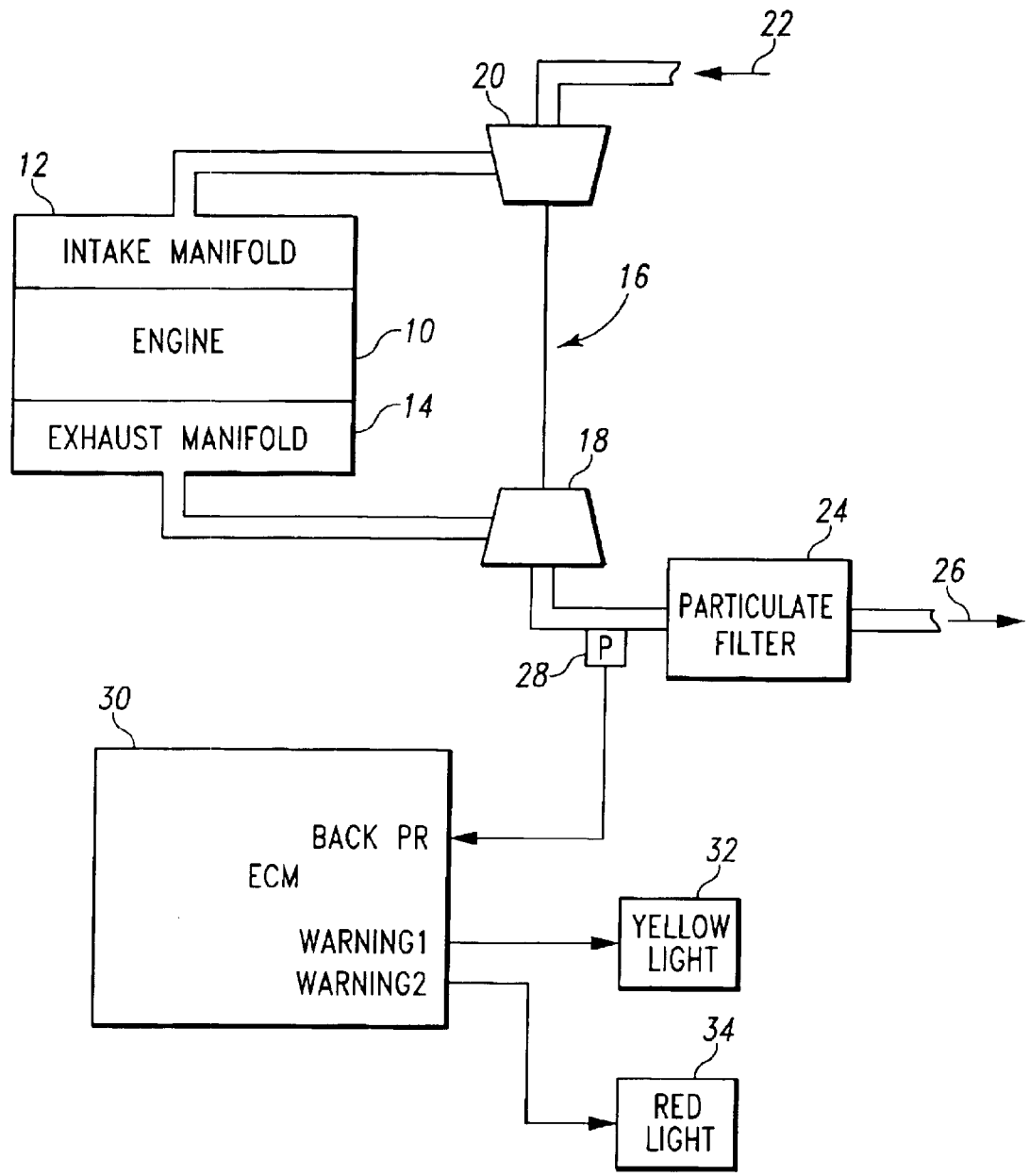
FIG. 1 is a schematic block diagram of a prior art engine and engine control system.

In one embodiment of the present invention, a system is disclosed for monitoring the backpressure produced by a particulate filter of an internal combustion engine. When the backpressure of the engine exceeds a predetermined threshold, indicating that the particulate filter should be serviced soon, an input to the electronic control module (ECM) indicating the intake manifold boost pressure is shunted to ground, thereby giving the ECM a false indication that no boost is being applied to the intake manifold. This will cause the ECM, according to its normal engine management software, to derate the engine performance to a "no air torque setting", thereby limiting the amount of torque that the vehicle operator can extract from the engine. This decreased performance of the engine provides a very high incentive to the vehicle operator to bring the vehicle in for servicing, at which point the particulate filter can be serviced. Upon servicing of the particulate filter, the backpressure threshold condition is no longer met, the input line to the ECM from the boost pressure sensor is no longer shunted to ground, and engine operation is returned to normal. Other embodiments of the present invention contemplate the use of engine performance derating in order to provide the vehicle operator with an incentive to have any sensed engine or vehicle condition serviced.

In another embodiment of the present invention, a method for derating an engine comprising an exhaust manifold and a particulate filter is disclosed, said derating to encourage servicing of a vehicle containing the engine, comprising the steps of a) sensing a backpressure between the exhaust manifold and the particulate filter; (b) determining if said sensed backpressure exceeds a first predetermined threshold; and derating a performance characteristic of the engine if said sensed backpressure exceeds the first predetermined threshold.

In yet another embodiment of the present invention, a method for derating an engine to encourage servicing of a vehicle containing the engine, comprising the steps of (a) sensing a condition indicating that the vehicle requires servicing; and (b) derating a performance characteristic of the engine in response to sensing said condition.

In another embodiment of the present invention, an internal combustion engine is disclosed, comprising at least one cylinder; an intake manifold coupled to said at least one cylinder; an exhaust manifold coupled to said at least one cylinder; a particulate filter coupled to said exhaust manifold; a first pressure sensor operative to sense an exhaust backpressure between the exhaust manifold and the particulate filter, said first pressure sensor having a first pressure sensor output; a second pressure sensor operative to sense a pressure within the intake manifold, said second pressure sensor having a second pressure sensor output; an engine control module (ECM) comprising: a first ECM input coupled to the first pressure sensor output; a second ECM input coupled to the second pressure sensor output; and a first ECM output; and a torque limiting device coupled between the first ECM output and the second ECM input; wherein the ECM compares the first pressure sensor output to a first predetermined threshold and changes the first ECM output if the first pressure sensor output exceeds a first predetermined threshold, wherein changing the first ECM output causes the torque limiting device to change the second ECM input, wherein changing the second ECM input causes the ECM to derate the engine.

In another embodiment of the present invention, an internal combustion engine is disclosed, comprising: at least one cylinder; an intake manifold coupled to said at least one cylinder; an exhaust manifold coupled to said at least one cylinder; a first sensor operative to sense a condition indicating that the engine requires servicing, said first sensor having a first sensor output; an engine control module (ECM) comprising a first ECM input coupled to the first sensor output; wherein the ECM derates the engine when the first sensor output indicates that the engine requires servicing.

In yet another embodiment of the present invention, a method for storing large quantities of data in a relatively small amount of electronic memory is disclosed, comprising the steps of: sensing a temperature after a predetermined first interval of time; determining if the sensed temperature is above a predetermined threshold; repeating steps (a) and (b) until a second interval of time has elapsed; determining a percentage of the second interval of time that the sensed temperature was above the predetermined threshold; and storing the percentage value in the electronic memory.

In another embodiment of the present invention, a method for determining whether an electrical system is activated is disclosed, comprising the steps of: (a) defining a starting value of $V_{bat}$; (b) setting a state to "off"; (c) sensing a power supply voltage of the system; (d) determining if the voltage sensed at step (c) is lower than $V_{bat}$ by a first predetermined amount; (e) if the voltage sensed at step (c) is lower than $V_{bat}$ by the first predetermined amount, then setting $V_{bat}$ equal to the voltage sensed at step (c); (f) determining if the voltage sensed at step (c) is greater than $V_{bat}$ by a second predetermined amount; (g) if the voltage sensed at step (c) is greater than $V_{bat}$ by a second predetermined amount, setting the state to "on"; (h) if the voltage sensed at step (c) is not greater than $V_{bat}$ by the second predetermined amount, returning to step (c); (i) sensing a power supply voltage of the system; (j) determining if the voltage sensed at step (h) is greater than $V_{bat}$ by a third predetermined amount; (k) if the voltage sensed at step (h) is greater than $V_{bat}$ by the third predetermined amount, then setting $V_{bat}$ equal to the voltage sensed at step (h); (l) determining if the voltage sensed at step (h) is lower than $V_{bat}$ by a fourth predetermined amount; (m) if the voltage sensed at step (h) is lower than $V_{bat}$ by the fourth predetermined amount, setting the state to "off"; and (n) returning to step (c).

In a final embodiment of the present invention, an electronic control module (ECM) for controlling an internal combustion engine is disclosed, the ECM comprising: a circuit board carrying at least one electronic processing device; and a magnetic switch mounted to the circuit board; wherein the magnetic switch is coupled to an input of the electronic processing device; and wherein passing a magnet near the magnetic switch is operative to change the state of the magnetic switch, thereby changing the input to the electronic processing device.

DETAILED DESCRIPTION OF THE PREFERRED EMBODIMENTS

For the purposes of promoting an understanding of the principles of the invention, reference will now be made to the embodiment illustrated in the drawings and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

For sake of clarity of description, the detailed description presented hereinbelow describes an electronic control module (ECM) 30 that provides all of the control functions required in the preferred embodiment, including accepting inputs of backpressure and boost pressure, determining if derating of engine performance is warranted, calculating fueling levels for the engine, creating outputs to activate a torque limiting device, lights, etc. However, in a particularly preferred embodiment, a separate emissions monitor (EM) is provided to accept the backpressure input, determine if derating of engine performance is warranted, and to create outputs to activate the torque limiting device and lights, while the remaining functions are performed by the ECM. The two configurations are equivalent, but the description of the system utilizing only a single ECM is more straightforward and has thus been presented below.

Figure 2:
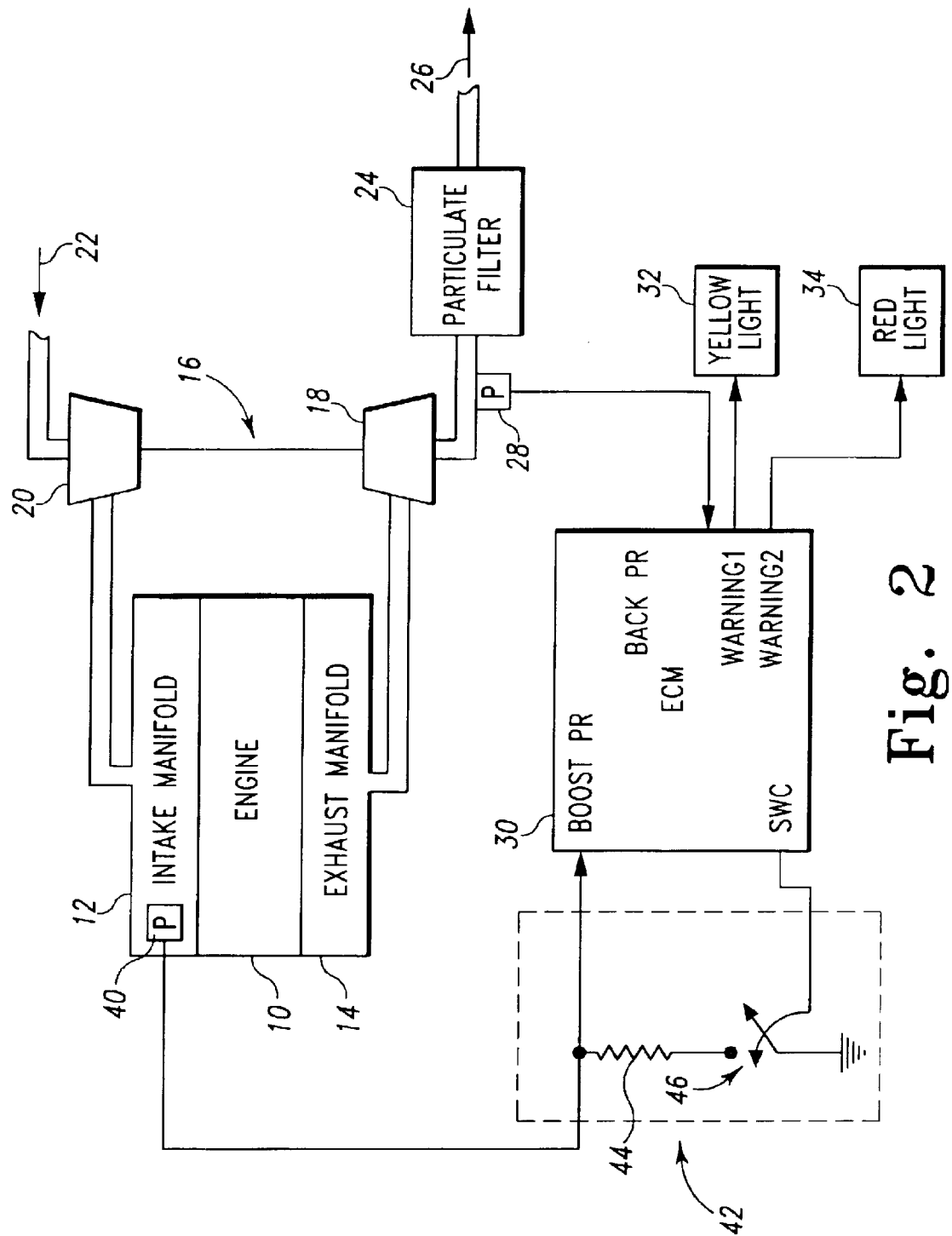
FIG. 2 is a schematic block diagram of an engine and engine control system of the preferred embodiment of the present invention.

Referring now to FIG. 2, there is illustrated a schematic block diagram of an engine and engine management system according to the preferred embodiment of the present invention. Individual components in FIG. 2 that are equivalent to components in the prior art system of FIG. 1 are designated using like reference numbers. In the system of FIG. 2, like the system of FIG. 1, backpressure upstream of the particulate filter 24 is sensed with a pressure sensor 28 and provided to the ECM 30. Also, like the prior art system, this pressure is compared to predetermined threshold levels and a yellow warning light 32 and/or red warning light 34 may be displayed to the vehicle operator when the measured backpressure exceeds predetermined thresholds; however, the use of the warning lights 32, 34 are optional in the preferred embodiment of the present invention.

One input to the ECM 30 that is common in turbocharged engines is a boost pressure, in which the pressure in the intake manifold is measured by a pressure transducer 40 and supplied to the ECM 30. Boost pressure is one of the variables typically used by the fueling software contained within ECM 30 in order to determine the amount of fuel to be delivered to the engine. The present invention provides an incentive to the driver to service the vehicle when the ECM 30 determines that this is desirable by inserting a torque limiting device 42 between the pressure transducer 40 and the ECM 30. In a preferred embodiment, the torque limiting device 42 comprises a resistor 44 and a switch 46 in series relationship, shunting the boost pressure signal from the pressure transducer 40 to ground when the switch 46 is closed. The switch 46 is operable by means of an output from the ECM 30. When the switch 46 is closed, the boost pressure signal from the pressure transducer 40 is shunted through the resistance 44 to ground, thereby providing a lower than actual input signal (representing the boost pressure) to the ECM 30.

Figure 3:
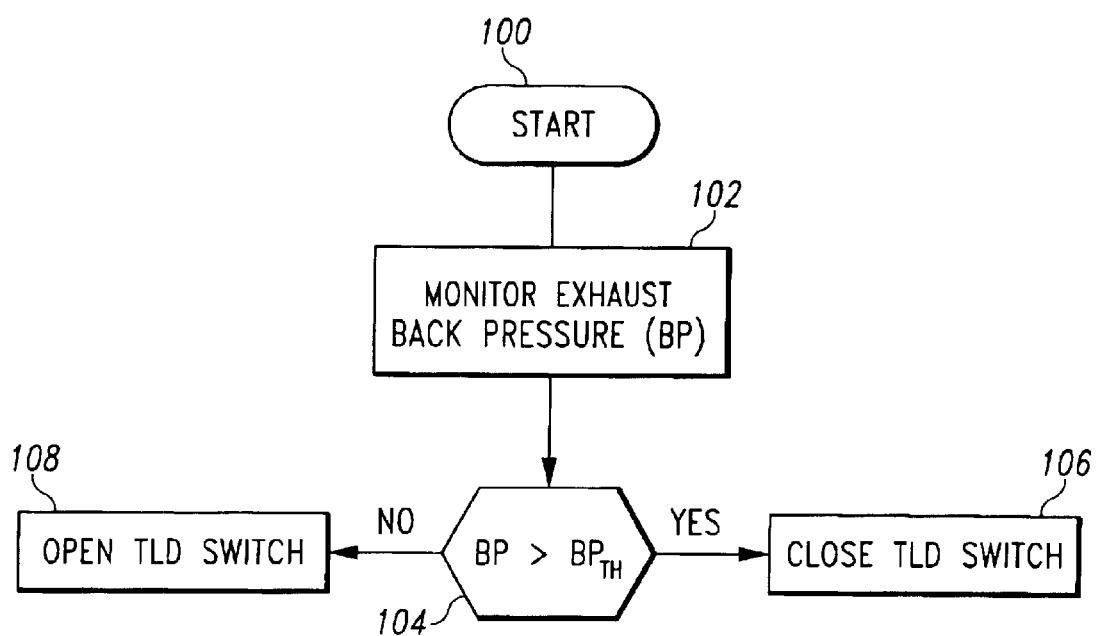
FIG. 3 is a schematic process flow diagram of a preferred embodiment method of the present invention.

Use of the torque limiting device 42 is illustrated in the schematic process flow diagram of FIG. 3. The process starts at step 100 and continues to step 102 where the exhaust backpressure reading from the pressure sensor 28 is input to the ECM 30. At step 104, the ECM 30 compares this measured backpressure signal (BP) to a predetermined backpressure threshold level ($BP_{TH}$). If step 104 determines that the measured backpressure BP is greater than the backpressure threshold $BP_{TH}$, then the ECM 30 activates the appropriate output signal to close switch 46, thereby shunting the boost pressure signal from pressure transducer 40 to ground through the resistor 44. This occurs at step 106. When the switch 46 is closed, the boost pressure sensor 40 signal is held by the resistor 44 to an in-range low condition, which the ECM 30 interprets as zero boost pressure with no active boost pressure sensor faults. If engine torque is requested by the vehicle operator under such conditions, fueling software resident within the ECM 30 automatically derates the engine to a so-called "no-air torque" setting (because the fueling software believes that there is currently no boost pressure).

As is known in the art, derating the engine in this manner results in less fuel being provided to the engine 10 and the operator of the vehicle will experience sluggish performance from the engine 10 in response to his request for more torque. If the yellow warning light 32 and red warning light 34 are provided to the driver and have been ignored, the derating of engine performance provided by the torque limiting device 42 will provide increased incentive to the operator to have the vehicle serviced. The same incentive will be provided to the operator if the yellow warning light 32 and red warning light 34 are not provided, however the driver will not be given prior warning before decreased engine performance requires service.

After the torque limiting device 42 is activated at step 106, the process returns to step 102 for continued monitoring of the engine backpressure. After servicing of the particulate filter 24, step 104 will determine that the measured backpressure BP is below the predetermined backpressure threshold $BP_{TH}$ and the process will move to step 108, at which point the ECM 30 will open the switch 46, thereby returning the sensed boost pressure input to the ECM 30 to normal. With a normal input being received from the boost pressure sensor 40, engine operation will return to normal. The process will then continue to step 102 for further backpressure monitoring. In a particularly preferred embodiment, the torque limiting device is latched once activated and can only be reset by service personnel.

As described hereinabove, the predefined backpressure threshold $BP_{TH}$ will typically be set above the pressure value that triggers activation of one or more warning lamps 32, 34. Thus, one or more warning lamps 32, 34 will be activated prior to activating the torque limiting device 42. The system and method of the present invention therefore provides an additional incentive (in the form of a performance disincentive) to encourage the vehicle operator to have the required particulate filter service/cleaning performed.

It will be appreciated by those having ordinary skill in the art that, while the preferred embodiment of the present invention has been described in relation to sensing backpressure caused by a particulate filter and shunting the boost pressure signal to ground once the signal exceeds the predetermined threshold, the concepts of the present invention can be applied to provide an incentive to a vehicle operator to perform any necessary service. Therefore, in its broadest form, the present invention provides for the sensing of a condition of a vehicle for which the operator of the vehicle should have service performed. In order to provide an incentive to the operator to perform this service, the performance of the engine can be derated in some manner such that lower than normal performance will be available from the vehicle engine until the required service has been performed. Such engine performance derating can be provided in a multitude of ways, including derating of the fueling command, limiting the engine speed, limiting gear transitions in an automatic transition, etc.

As is known in the art, the particulate filter 24 is regenerated when the temperature of the particulate matter filter 24 exceeds a predefined temperature. At this predefined temperature, particulate matter trapped in the filter 24 is burned off in order to regenerate the filter. Many factors can contribute to the temperature of the particulate filter 24, including length of time that the engine 10 is allowed to idle, ambient temperature, etc. It is often desired to log for future reference the temperature of the particulate filter 24 into a memory associated with the ECM 30. In certain prior art systems, one megabyte of flash memory is allocated to store this temperature data, which results in only approximately one week's worth of data being stored before it must be overwritten.

The present invention contemplates that it will often be desirable to log temperature data for the particulate filter 24 for a period of time much greater than the one week accommodated in the prior art example. In order to do this, the present invention establishes a predetermined threshold and logs the percent of time the particulate filter 24 was above or below the threshold. For example, if the regeneration temperature of the particulate filter 24 is 260° C., and it is determined that the particulate filter 24 should be above that temperature for 40% of any recorded hour, then a sample temperature may be taken every 10 seconds (6 times per minute or 360 times per hour). If the sample is above 260° C., then that fact is temporarily recorded. If more than 144 such measurements above 260° C. are recorded for any particular 360 samples, then the temperature of the particulate filter 24 has exceeded the predetermined threshold. By tallying how many of the ten second interval samples were above the threshold, it is possible to calculate the percentage above or below the predetermined 40% threshold at which the particulate filter 24 was operated.

Figure 4:
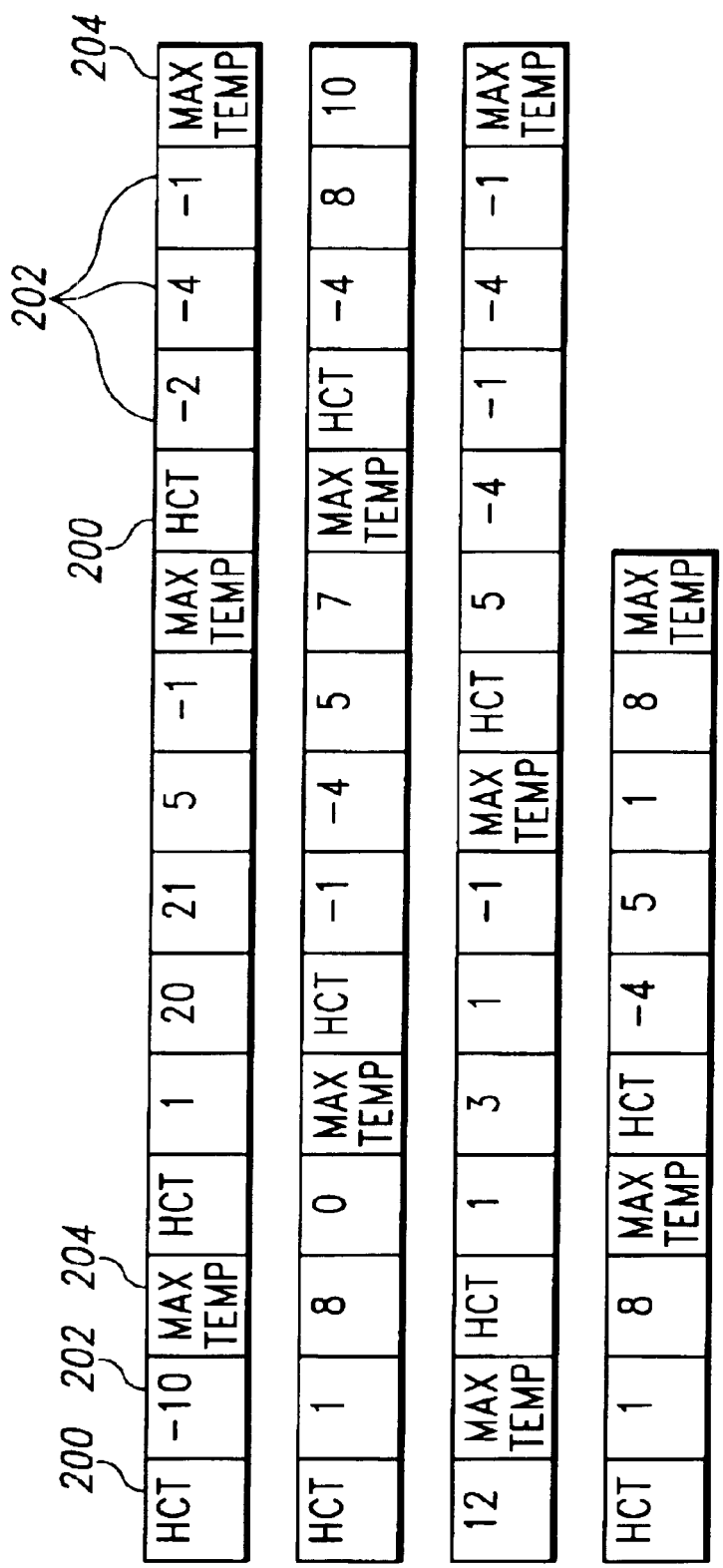
FIG. 4 is a schematic diagram of a drive cycle memory storage technique according to the present invention.

In order to store this information in as compact a memory space as possible, the present invention comprehends a data storage scheme as illustrated in FIG. 4. The first byte 200 in any drive cycle indicates the number of hours in that drive cycle (a drive cycle begins with starting of the engine and ends with turning off of the engine). In the preferred embodiment, operation of the engine for more than one-half an hour will be counted as at least a one hour drive cycle. Similarly, operation of the engine for multiple hours ending with a partial hour that is greater than one-half hour will result in the last partial hour being counted as an hour in the drive cycle. For any hour of the drive cycle, the percentage above or below the threshold is calculated as follows:

$$\left[\left[\frac{\sum_{60 \text{ min}} \text{Number of Temperature Readings} >= \text{Logging Temperature}(10 \text{ sec Sample Rate})}{\text{Total Number of Samples}}\right] - 0.4\right] \times 100$$

The percent above or below the threshold percentage for each hour of the drive cycle is then recorded as successive bytes 202. Finally, the maximum temperature recorded during the current drive cycle is recorded in storage location 204. As illustrated in FIG. 4, if the first storage location 200 of any particular drive cycle indicates that there are multiple hours in the drive cycle, then there will be multiple storage locations 202 following that contain the data points for each hour in the drive cycle.

By storing the data as described hereinabove with respect to FIG. 4, it is possible to track whether the vehicle has been operated in a manner (such as by prolonged periods of idling) which will cause the particulate filter 24 to become prematurely clogged because it is not above the regeneration temperature for long enough periods of time. This data can be useful for explaining to the owner of the vehicle why the particulate filter 24 required service at more frequent intervals than would be expected.

Figure 5:
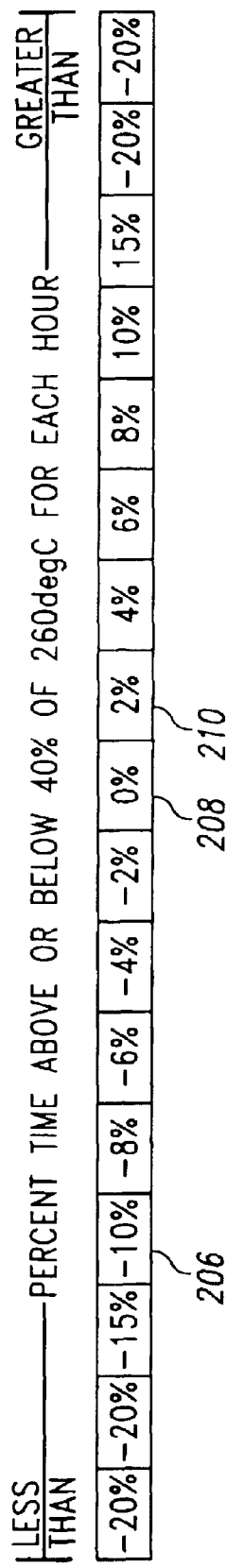
FIG. 5 is a schematic diagram of a filter cleaning cycle bucket memory technique of the present invention.

In order to further reduce the size of memory needed to store the filter temperature data, summary data of the information stored according to FIG. 4 may be stored in another part of memory in order to further preserve the usefulness of the information. For example, in the preferred embodiment, the filter percent threshold data illustrated in FIG. 4 is archived after ten drive cycles. This is done by putting the data from the memory locations 202 into a second portion of memory which contains filter cleaning cycle "buckets" as illustrated in FIG. 5. For each threshold percentage data 202, one of the memory buckets illustrated in FIG. 5 that is nearest the value in the memory location 202 is incremented by one. For example, the first threshold percentage value 202 illustrated in FIG. 4 is −10. This value would be recorded in the filter cleaning cycle buckets of FIG. 5 by increasing the number stored at location 206 by one. Because there is not a separate bucket for each possible threshold percentage data point, the bucket that is nearest to the actual value (rounding up) is incremented in the preferred embodiment. Other methods for allocating data for the individual buckets will be apparent to those having ordinary skill in the art. As a further example, the next percentage threshold data point 202 illustrated in FIG. 4 has a value of one. Because this falls half way between the buckets 208 and 210, the bucket 210 is incremented by one. Once all of the data storage locations 202 have been transferred to the filter cleaning cycle buckets of FIG. 5, the memory location illustrated in FIG. 4 can be erased in preparation for the recording of another ten drive cycles. Alternatively, only the oldest drive cycle can be transferred to the filter cleaning cycle buckets of FIG. 5 and that portion of memory can be written over.

Figure 6:
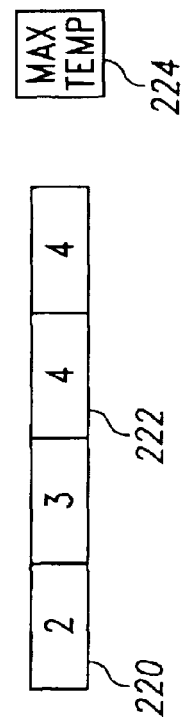
FIG. 6 is a schematic diagram of a filter temperature bucket memory technique according to the present invention.

Additionally, the maximum temperature data 204 in FIG. 4 is also consolidated before the memory of FIG. 4 is cleared for further use. A third memory area, as illustrated in FIG. 6, is set aside to record the number of consecutive drive cycles that the maximum temperature 204 was below the regeneration temperature. For example, if the maximum temperature 204 was below the regeneration temperature for two consecutive drive cycles, then the bucket 220 would be incremented by one. If four consecutive drive cycles were recorded at a maximum temperature 204 below the regeneration temperature, then bucket 222 would be incremented by one. Finally, the maximum temperature observed during the entire drive cycle is recorded at memory location 224.

The information contained in the memory buckets illustrated in FIGS. 5 and 6 are preferably retained until the particulate filter 24 is serviced, at which time the two bucket tables of FIGS. 5 and 6 are written to another portion of memory for long term storage. Using the techniques discussed hereinabove with respect to FIGS. 4–6, it is possible to store seven or more years worth of historical data in a relatively small amount of memory.

The present invention also comprehends the storage of further data concerning the particulate filter 24. For example, when the yellow light 32 is activated, this event can be stored in memory. Experience has shown that sometimes a mechanic will reset the yellow warning light without actually cleaning the particulate filter 24. If this occurs, storage of the yellow light events can track the number of times the yellow light 32 (or red light 34) came on and how long it stayed on before the particulate filter 24 was cleaned. In the preferred embodiment of the present invention, three bytes are allocated for yellow light 32 events (highest numbers of hours light remained on, next highest, next highest). Similarly, the number of hours that the red light 34 (derate activated) remained on can be stored. The number of hours between particulate filter 24 cleanings can also be stored. When the particulate filter 24 is cleaned, all of this information can similarly be stored into long term bucket memory as discussed above with respect to FIGS. 5 and 6. Using these techniques, all of the data discussed hereinabove with respect to FIGS. 5–6 can be stored within 500 bytes of memory.

The methods described hereinabove require that the engine control module 30 be able to determine the engine state (i.e. whether the engine is on or off). Under traditional prior art methods, this would require an extra input to the ECM 30, increasing system and installation costs from the extra connections (e.g. from a data link and/or an RPM sensor).

One way to circumvent this increased cost due to extra inputs and installation is to observe the battery voltage that is used to power the ECM 30. Since most vehicles have alternators that are activated when the engine is on, one can observe the delta change in battery voltage and determine whether an engine is running or not (i.e. the state of the engine). One problem with simply determining whether the battery voltage is above or below a predetermined threshold is that charging system conditions within the vehicle can easily change, making fixed battery set points invalid and creating the possibility that the state of the engine will be improperly determined. Also, separate systems would have to be developed for 12 volt and 24 volt vehicle systems.

An example of changing conditions within the vehicle charging system is corrosion on wire connections. Connections between wires will cause a certain amount of voltage drop depending upon the amount of current running through the connection. Increased corrosion will normally increase the amount of voltage drop at the connection. Such a voltage drop would change the voltage that a control system would see at the battery connection, and therefore could give a false indication. Likewise, a faulty alternator may put out lower power or worn out batteries may have internal shorts, allowing for a lower overall battery voltage to be sensed.

In order to circumvent these problems, the present invention utilizes an adaptive algorithm which does not require fixed battery set points in order to determine the state of the engine. The algorithm of the present invention will adapt to the level of voltage being applied at the present time and will adjust to decay of battery voltage (state of battery), changing alternator performance, or even the age of the wiring which could allow more voltage drop with time due to corrosion.

Figure 7:
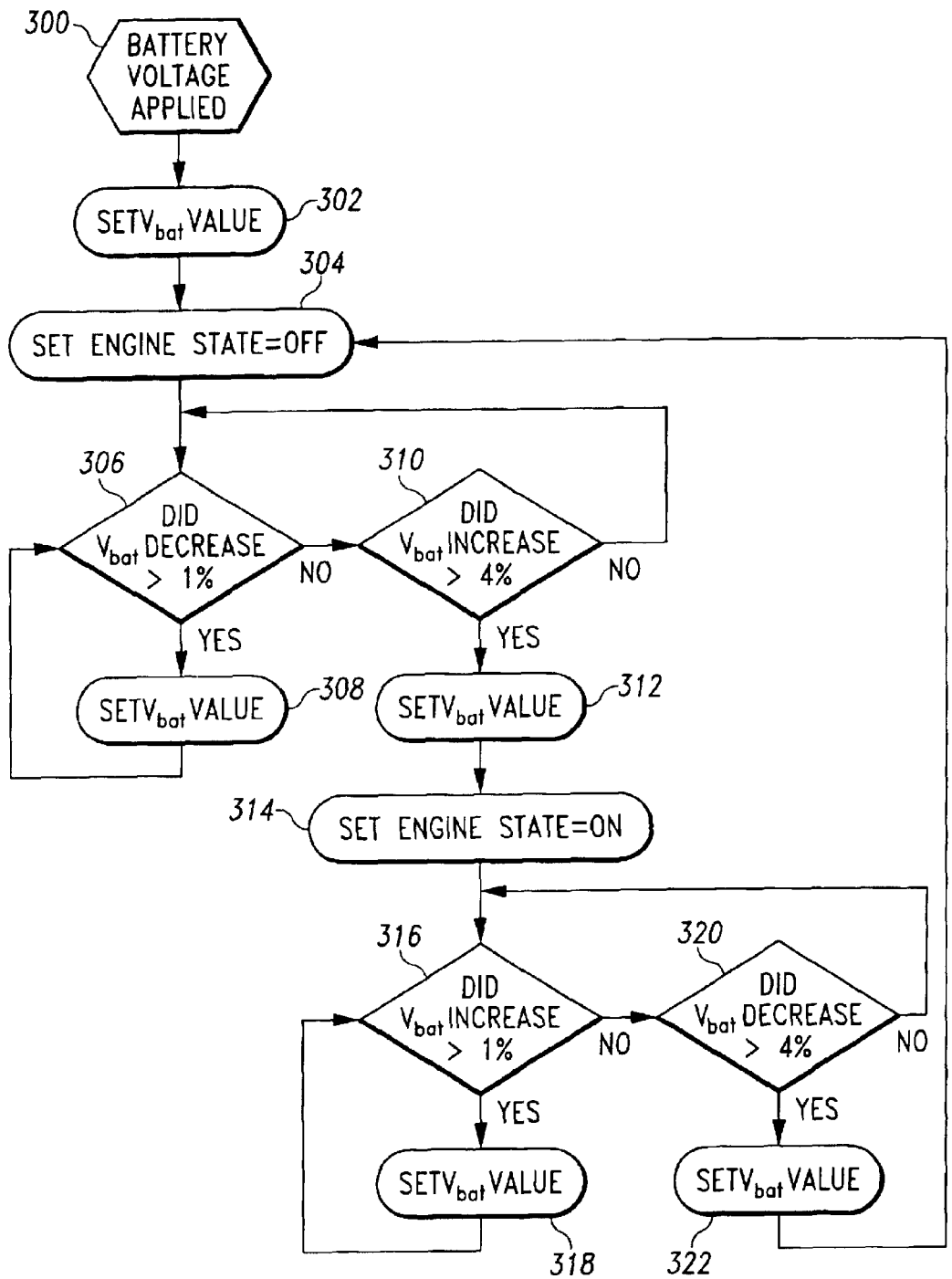
FIG. 7 is a schematic process diagram of an engine state determination algorithm according to the present invention.

The method of the present invention allows the ECM 30 to be attached to either the switched or unswitched battery supply. A schematic process flow diagram for the preferred embodiment algorithm of the present invention is illustrated in FIG. 7. Battery voltage is applied to the ECM 30 at 300. This battery voltage is sensed by the ECM 30 and is recorded as the variable $V_{bat}$ at step 302. As an initial starting point, the engine state is declared to be "off" at step 304. Decision block 306 determines whether $V_{bat}$ has decreased by a predetermined percentage (1% in the preferred embodiment). If $V_{bat}$ has decreased by the predetermined percentage, then the value of $V_{bat}$ is set to the new voltage at 308. Therefore, $V_{bat}$ will track the true current voltage and the algorithm will stay in the 306/308 loop as long as the current engine state equals "off" and the $V_{bat}$ is decreasing.

If step 306 determines that $V_{bat}$ has not decreased by greater than the predetermined percentage, then the algorithm precedes to decision block 310 which determines whether $V_{bat}$ has increased by greater than a second predetermined percentage (4% in the preferred embodiment). The algorithm detects a change in engine state by looking for an increase in $V_{bat}$ by greater than this second predetermined percentage. Therefore, if decision block 310 determines that $V_{bat}$ did not increase by greater than 4%, then the engine state remains equal to "off" and the algorithm returns to step 306. If, on the other hand, step 310 determines that $V_{bat}$ increased by greater than 4%, then $V_{bat}$ is set equal to this new value at step 312 and the engine state is changed to "on" at step 314.

Once the engine state changes to "on", the algorithm looks for opposite changes in $V_{bat}$ in order to determine that the engine state should be declared to be "off". Therefore, decision block 316 looks for an increase in $V_{bat}$ of greater than 1%. If this occurs, then $V_{bat}$ is set equal to the new battery voltage at step 318 and the algorithm returns to step 316. Because $V_{bat}$ would be expected to be remaining constant or steadily increasing when the engine state was equal to "on", the algorithm will stay within the loop 316/318 as long as this is the case.

If step 316 determines that $V_{bat}$ did not increase by greater than 1%, then the algorithm precedes to step 320 which looks for a decrease in $V_{bat}$ of greater than 4%. Such a decrease would indicate that the engine had been switched off. If step 320 determines that $V_{bat}$ did not decrease by greater than 4%, then the algorithm returns to step 316. If, on the other hand, step 320 determines that $V_{bat}$ decreased by greater than 4%, then $V_{bat}$ is set equal to the new sensed battery voltage at step 322, the engine state is set equal to "off" at step 304, and the algorithm returns to step 306.

It will be appreciated by those having ordinary skill in the art that the preferred embodiment algorithm of FIG. 7 allows the engine state to be accurately determined without the use of an extra input to the ECM 30. Furthermore, the correct engine state is sensed even in conditions of changing charging system conditions.

In another aspect of the present invention, it is recognized that the ECM 30 is normally attached in the prior art permanently to the vehicle near the item to be controlled or monitored. This method requires adequate space to be found upon the vehicle upon which to mount the ECM 30, as well as installation time and appropriate mounting hardware. Furthermore, wiring must be run between the ECM 30 and the item to be controlled or monitored. This results in added cost, weight and installation time due to the need to route wiring between the ECM 30 and the other items. Finally, if similar systems are mounted in different vehicles, the components may be placed differently due to size constraints, added features or simply because of the particular type of application. This causes the ECM 30 to be mounted in different locations, which requires a multiple number of wiring harnesses to be made to accommodate these different mounting situations.

Most wiring harnesses are pre-made in order to reduce costs and increase ease of installation. Having many different harness configurations, however, negates the cost savings and actually increases the cost of manufacturing and inventory of these harnesses.

Figure 8:
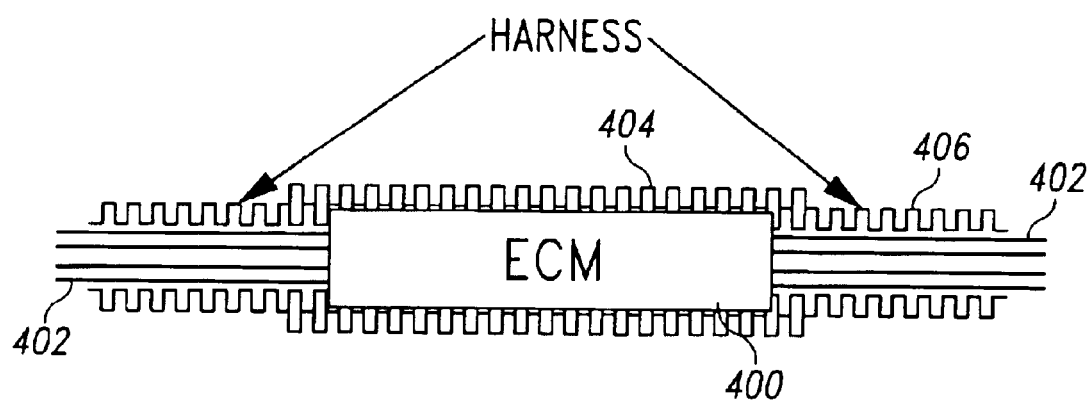
FIG. 8 is a schematic cross-sectional view of an integral overmolded ECM and wiring harness according to the present invention.

The present invention comprehends decreasing the cost of installation and reducing the number of mounting and harness configurations by placing the ECM 30 in a common place regardless of the different application to which it is fitted. This can be achieved by placing the ECM on the inside of the wiring harness or adjacent the wiring harness and mounted thereto. With reference to FIG. 8, there is illustrated a preferred embodiment of the present invention. The ECM 400 preferably comprises a circuit board having all necessary electrical components attached thereto, such as a microprocessor and required support circuitry. A plurality of wires 402 are coupled to the ECM 400 in order to provide the necessary input and output paths. The ECM 400 is overmolded with plastic or other suitable material in order to render it impervious to environment conditions such as humidity, vibration, etc. The ECM overmold is indicated at 404. Optionally, the wiring harness 406 can be made integrally during the ECM overmolding process such that the ECM overmold 404 and the wiring harness 406 form an integral unit.

In an alternative embodiment, the ECM 400 is overmolded 404 and the structure is mounted to the exterior of the wiring harness, with the appropriate wires 402 coupling between the wiring harness and the ECM 400. In this situation, the ECM overmold 404 is not integral with the wiring harness overmold 406; however, because the ECM 400/404 is mounted to the wiring harness 406, similar advantages to the configuration illustrated in FIG. 8 are achieved.

It will be appreciated that mounting the ECM 400 integrally with the wiring harness 406 or attaching it thereto alleviates the need for finding a mounting location for the ECM 400 on the vehicle proper. Furthermore, because the ECM is intimately located with the wiring harness, there is no need to route extensive wiring between the ECM wiring harness 406. Different mounting locations will not be necessary in different applications and therefore different wiring harnesses between the ECM 400 and the wiring harness 406 will not have to be maintained or installed. The ECM mounting configuration of the present invention therefore overcomes many of the limitations of the prior art mounting method.

In another aspect of the present invention, the need for the service technician to reset the ECM 30 has been discussed hereinabove with respect to servicing the particulate filter 24. In a typical prior art application, an external switch was applied for use with the ECM 30 in order to execute testing and resetting of the ECM 30. The provision of such a switch required an extra input to the ECM 30 in order to accommodate sensing of the switch position, as well as added installation cost. In order to alleviate these extra costs, the present invention comprehends the use of a magnetic switch formed integrally to the ECM. By installing a magnetic switch as part of the ECM circuit board, the need for an extra input line to the ECM is obviated, thereby reducing the cost of material, the labor cost and a reduction in installation time. Also, the integrity of the ECM packaging is improved (due to a decrease in the number of inputs that need to penetrate the ECM packaging), thereby improving the ECM's robustness.

For an ECM package, such as the ECM 400 of FIG. 8, a preferred embodiment of the present invention utilizes a magnetic read switch or a solid state switch mounted to the ECM 400 circuit board and encapsulated therewith as part of the overmolding 404 process. In order to activate the switch (to test or reset the ECM 400), it is only necessary for the technician to pass a magnet over the switch, which is preferably marked with a conspicuous marking on the overmolding 404 package. Interaction of the magnetic field from the magnet with the ECM switch causes its activation, thereby implementing the testing or resetting function.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed:

1. A method for derating an engine comprising an exhaust manifold and a particulate filter, said derating to encourage servicing of a vehicle containing the engine, comprising the steps of:
    a) sensing a backpressure between the exhaust manifold and the particulate filter;
    b) determining if said sensed backpressure exceeds a first predetermined threshold; and
    c) derating a performance characteristic of the engine if said sensed backpressure exceeds the first predetermined threshold.

2. The method of claim 1, further comprising the steps of:
    d) determining if said sensed backpressure exceeds a second predetermined threshold, wherein the second predetermined threshold is lower than the first predetermined threshold; and
    e) communicating a warning to a driver of the vehicle if said sensed backpressure exceeds the second predetermined threshold.

3. The method of claim 2, further comprising the steps of:
    f) determining if said sensed backpressure exceeds a third predetermined threshold, wherein the third predetermined threshold is lower than the first predetermined threshold and higher than the second predetermined threshold; and
    g) communicating a warning to a driver of the vehicle if said sensed backpressure exceeds the third predetermined threshold.

4. A method for derating an engine to encourage servicing of a vehicle containing the engine, comprising the steps of:
    a) sensing a condition indicating that the vehicle requires servicing; said sensed condition comprises an exhaust manifold backpressure exceeding a first predetermined threshold; and
    b) derating a performance characteristic of the engine in response to sensing said condition.

5. The method of claim 4, wherein step (b) comprises reducing a turbocharger boost of the engine.

6. An internal combustion engine, comprising:
    at least one cylinder;
    an intake manifold coupled to said at least one cylinder;
    an exhaust manifold coupled to said at least one cylinder;
    a particulate filter coupled to said exhaust manifold;
    a first pressure sensor operative to sense an exhaust backpressure between the exhaust manifold and the particulate filter, said first pressure sensor having a first pressure sensor output;
    a second pressure sensor operative to sense a pressure within the intake manifold, said second pressure sensor having a second pressure sensor output;
    an engine control module (ECM) comprising:
    a first ECM input coupled to the first pressure sensor output;
    a second ECM input coupled to the second pressure sensor output; and
    a first ECM output; and
    a torque limiting device coupled between the first ECM output and the second ECM input;
    wherein the ECM compares the first pressure sensor output to a first predetermined threshold and changes the first ECM output if the first pressure sensor output exceeds a first predetermined threshold, wherein changing the first ECM output causes the torque limiting device to change the second ECM input; wherein changing the second ECM input causes the ECM to derate the engine.

7. The internal combustion engine of claim 6, further comprising:
    a turbocharger coupled between the exhaust manifold and the intake manifold;
    wherein the ECM derates the engine by reducing a boost created by the turbocharger.

8. The internal combustion engine of claim 6, further comprising:

a second ECM output; and a first warning light coupled to the second ECM output;

wherein the ECM compares the first pressure sensor output to a second predetermined threshold and changes the second ECM output if the first pressure sensor output exceeds a second predetermined threshold, wherein changing the second ECM output causes the first warning light to illuminate.

9. The internal combustion engine of claim 8, further comprising:

a third ECM output; and a second warning light coupled to the third ECM output;

wherein the ECM compares the first pressure sensor output to a third predetermined threshold and changes the third ECM output if the first pressure sensor output exceeds a third predetermined threshold, wherein changing the third ECM output causes the second warning light to illuminate.

10. The internal combustion engine of claim 9, wherein the third predetermined threshold is lower than the first predetermined threshold and higher than the second predetermined threshold.

11. The internal combustion engine of claim 6, wherein said torque limiting device comprises:

a resistor having a first resistor terminal coupled to said second ECM input and having a second resistor terminal; and a switch having a first switch terminal coupled to the second resistor terminal and having a second switch terminal coupled to ground;

wherein the switch is activated by said first ECM output.

12. An internal combustion engine, comprising:

at least one cylinder;

an intake manifold coupled to said at least one cylinder;

an exhaust manifold coupled to said at least one cylinder;

a first sensor operative to sense a condition indicating that the engine requires servicing said first sensor having a first sensor output and said condition comprises an exhaust backpressure;

an engine control module (ECM) comprising a first ECM input coupled to the first sensor output; and the ECM derates the engine when the first sensor output indicates that the engine requires servicing.

13. The internal combustion engine of claim 12, wherein the ECM derates the engine by reducing a turbocharger boost.

* * * * *